United States Patent

Kuriyama et al.

Patent Number: 5,571,623
Date of Patent: Nov. 5, 1996

[54] FINE POLYURETHANE PARTICLES, COLLOIDAL POLYUREA PARTICLES, AND PRODUCTION PROCESSES THEREOF

[75] Inventors: Katsumi Kuriyama, Koshigaya; Takao Endoh, Iwatsuki; Teruo Akita, Yono, all of Japan

[73] Assignees: Dainichiseika Color & Chemical Mfg. Co., Ltd.; Ukima Colour & Chemicals Mfg, Co., Ltd., both of Tokyo, Japan

[21] Appl. No.: 312,839

[22] Filed: Sep. 27, 1994

[30] Foreign Application Priority Data

Sep. 28, 1993 [JP] Japan .................. 5-263102

[51] Int. Cl.$^6$ .............. B32B 5/16; B32B 27/08; B32B 27/40
[52] U.S. Cl. .......... 428/403; 428/407; 428/423.1; 428/423.3; 428/424.2; 524/589; 524/590; 524/839; 524/904; 525/458; 525/902; 528/49; 528/53; 528/59; 528/61; 528/67; 528/68; 528/75; 528/902; 521/137
[58] Field of Search ............... 428/403, 407, 428/423.1, 423.3, 424.2; 524/589, 590, 839, 904; 525/458, 902; 528/49, 59, 53, 61, 67, 68, 75, 902; 521/137

[56] References Cited

U.S. PATENT DOCUMENTS

4,746,684  5/1988  Kuriyama et al. .
4,764,553  8/1988  Mosbach et al. .................. 524/591

Primary Examiner—James J. Seidleck
Assistant Examiner—Duc Truong
Attorney, Agent, or Firm—Oblon, Spivak, McClelland, Maier & Neustadt, P.C.

[57] ABSTRACT

Fine polyurethane particles or fine polyurethane gel particles, which have been surface-covered with colloidal polyurea particles, are provided. They are produced by emulsion polymerization of a polyisocyanate compound and an active-hydrogen-containing compound in an inert liquid while using colloidal polyurea particles as an emulsifier.

9 Claims, 2 Drawing Sheets

FINE POLYURETHANE PARTICLES, COLLOIDAL POLYUREA PARTICLES, AND PRODUCTION PROCESSES THEREOF

BACKGROUND OF THE INVENTION

1. Field of the Invention

This invention relates to fine polyurethane particles useful as powder coating compositions, powder coating agents, an additive for coating compositions or a modifier for resins, rubbers and elastomers; and also to a process for the production of the fine polyurethane particles.

In addition, this invention also relates to fine polyurethane gel particles which are useful as a modifier capable of imparting, to coating compositions, resins, rubbers, elastomers or the like, excellent properties such as oil absorbance, heat resistance and abrasion resistance; and also to a process for the production of the fine polyurethane gel particles.

This invention is also concerned with colloidal polyurea particles; and a production process thereof.

2. Description of the Related Art

Fine polyurethane particles have conventionally been used as powder coating compositions, powder molding compositions, additives for coating compositions and modifiers for resins, rubbers or elastomers.

On the other hand, a polyurethane gel is obtained by a three-dimensional reaction of a polyisocyanate with an active-hydrogen-containing compound and is excellent in solvent resistance, heat resistance, abrasion resistance and oil absorbance.

As a method for making use of such excellent properties of the polyurethane gel, it is conducted to blend a polyurethane raw material (polyisocyanate), which has not been gelated yet, in a coating composition, coating agent, molding resin, rubber or elastomer and after forming the resulting blend into a coating film or a molding, to complete its gelation.

The above method, however, is accompanied with such a drawback that the crosslinking density of the gel is hardly controllable and depending on the degree of crosslinking of the gel, the compatibility of the gel with a coating film or molding may be lowered or physical properties of the coating film or molding may conversely be deteriorated. The above method is therefore limited in its application range.

As a method for overcoming such a problem, it is also conducted to first prepare fine polyurethane gel particles and then to mix them in a coating material or a molding resin. Conventional production methods for fine polyurethane gel particles includes, for example, mechanical grinding of a solid polyurethane gel at low temperatures, precipitation of fine polyurethane gel particles from an aqueous emulsion and subsequent drying, spray drying, and addition of a bad solvent to a solution-polymerized polyurethane gel to precipitate the polyurethane gel in the form of fine particles, followed by collection by filtration and further by drying for the elimination of the solvent.

These conventional processes are however accompanied by the problems that the resulting fine polyurethane gel particles have irregular shapes and cannot be obtained as fine polyurethane gel particles. They also involve the additional problem that the production cost is considerably high.

On the other hand, processes making use of an inert liquid are also known, including those disclosed in U.S. Pat. No. 3,787,525 and Japanese Patent Applications Laid-Open (Kokai) Nos. HEI 2-4860, HEI 2-38453 and HEI 4-255755.

The above methods and/or processes are also used in exactly the same manner for the production of ungelated fine polyurethane particles The former approaches are not considered practical for inferior productivity. The latter approaches, on the other hand, all require a special dispersion stabilizer, leading to the problem that a limitation is imposed on the combination of the composition of the polyurethane or polyurethane gel as a dispersoid and the dispersion stabilizer. The latter approaches are also accompanied with such drawbacks that the composition of the polyurethane or polyurethane gel so synthesized is limited to a narrow range, that the particle size of the fine polyurethane particles or fine polyurethane gel particles cannot be controlled easily and that upon collection of the fine polyurethane particles or fine polyurethane gel particles from the dispersion, the particles tend to stick together into coarser particles.

SUMMARY OF THE INVENTION

An object of the present invention is to overcome the above-described drawbacks of the conventional methods and processes and hence to easily provide fine polyurethane particles or fine polyurethane gel particles which are available in various compositions with a narrow particle size distribution, thereby permitting their use in a wide range of application fields.

With a view toward attaining the above objects, the present inventors have conducted extensive research. As a result, it has been found that colloidal polyurea particles dispersed in an inert liquid can emulsify easily and moreover, as fine particles a polyisocyanate compound and an active-hydrogen-containing compound, both being raw materials for the synthesis of polyurethane or polyurethane gel, in the inert liquid; that in such a state, the polyisocyanate compound and the active-hydrogen-containing compound are polymerized to form fine polyurethane particles or fine polyurethane gel particles, which have colloidal polyurea particles uniformly adhered on and around their surfaces; and that when the fine particles are collected from the dispersion medium, they are covered uniformly with the colloidal particles, leading to the completion of the invention.

In one aspect of the present invention, there are thus provided fine polyurethane particles which have surfaces covered with colloidal polyurea particles; and a production process thereof.

In another aspect of the present invention, there are also provided three-dimensionally-crosslinked fine polyurethane gel particles surface-covered with colloidal polyurea particles; and a production process thereof.

In a further aspect of the present invention, there are also provided colloidal polyurea particles which are dispersed in a solvent and each comprises a solvated portion and an unsolvated portion, said unsolvated portion having a particle size of from 0.01 µm to 1.0 µm; and a production process thereof.

The fine polyurethane particles and the production process thereof, both according to the present invention, have the following advantages:

1. Production of fine polyurethane particles with a controlled particle size is feasible.

2. Production of crosslinked thermoplastic fine polyurethane particles is feasible, so that a wide variety of application fields can be expected.

3. Colloidal polyurea particles are uniformly adhered on or otherwise uniformly cover surfaces of the resulting fine polyurethane particles. The fine particles are therefore extremely good in free flowing property and their handling is easy. They have therefore various merits, for example, extremely easy transportation, metering, and re-dispersion into a liquid or resin.

For the advantages described above, the fine polyurethane particles according to the present invention have a wide range of utility, for example, as coating compositions or lining materials, which can be applied by a known powder coating or forming method; industrial parts or components such as hammers, gears, packings and dust covers; soles of sport shoes; wrist watch bands; casters; paints or coating compositions for hoses, tubes, belt conveyors and electric cables; modifiers for coating compositions, rubbers and resins; urethane paints obtained by dissolving the particles in a solvent; a material for synthetic leather; adhesives; and when colored, as colorants and powdery inks (toners).

The fine polyurethane gel particles and production process thereof, both according to the present invention, have the following advantages:

1. Production of fine polyurethane particles with a controlled particle size is feasible.

2. Resulting fine polyurethane gel particles are true spherical, and colloidal polyurea particles are uniformly adhered on or otherwise uniformly cover surfaces of the resulting fine polyurethane particles. The fine particles are therefore extremely good in free flowing property and their handling is easy. They have therefore various merits, for example, extremely easy transportation, metering, and re-dispersion into a liquid or resin.

3. Owing to these advantages, the polyurethane gel particles according to the present invention are useful as a modifier capable of imparting, to coatings, resins, rubbers, elastomers and the like, excellent properties such as oil absorbance, heat resistance and abrasion resistance.

As a characteristic property of the colloidal polyurea particles employed in the present invention, the colloidal polyurea particles act to prevent the substantial viscosity increase which would otherwise occur in the course of the synthesis of fine polyurethane particles or fine polyurethane gel particles. This action can prevent coagulation of the fine polyurethane particles or fine polyurethane gel particles and permits the retention of the excellent dispersion stability. This action is fundamentally different from that available from organic emulsifiers or dispersion stabilizers known to date.

DETAILED DESCRIPTION OF THE PREFERRED EMBODIMENTS

This invention will next be described more specifically by preferred embodiments of the invention.

Fine polyurethane particles or fine polyurethane gel particles according to the present invention can be obtained by subjecting a polyisocyanate compound and an active-hydrogen-containing compound to emulsion polymerization in an inert liquid in the presence of colloidal polyurea particles serving as an emulsifier. The fine polyurethane particles or fine polyurethane gel particles so obtained have surfaces covered with the colloidal polyurea particles.

The fine polyurethane particles or the fine polyurethane gel particles can be obtained by the method or process described above. As a preferred production method or process, the following may be mentioned. Namely, the fine polyurethane particles or the fine polyurethane gel particles can be synthesized by charging an inert solvent, which contains colloidal polyurea particles dispersed therein, in a jacketed synthesis reactor equipped with a stirrer an emulsifying device, adding a solution of a polyisocyanate compound and an active-hydrogen-containing compound in an inert solvent to the reactor, emulsifying and reacting the raw materials; or by separately emulsifying the polyisocyanate compound and the active-hydrogen-containing compound in an inert solvent in the presence of the colloidal polyurea particles and then reacting them.

Although no particular limitation is imposed on the temperature for the synthesis of the fine polyurethane particles or the fine polyurethane gel particles, preferred temperatures range from 40° C. to 120° C. The colloidal polyurea particles used upon synthesis may amount to 0.5 part by weight or more, preferably 1.0 to 20 parts by weight per 100 parts by weight of each of the polyisocyanate compound or the active-hydrogen-containing compound. Amounts less than 0.5 part by weight cannot emulsify the raw materials sufficiently, resulting in the formation of large coagular fine polyurethane particles or fine polyurethane gel particles in the course of their synthesis and hence making it difficult to obtain fine polyurethane particles or fine polyurethane gel particles as intended. On the other hand, amounts greater than 20 parts by weight do not have any problem in the dispersing ability for the raw materials so that a dispersion of fine polyurethane particles or fine polyurethane gel particles can be produced. These amounts are however excessive in view of their intended use as an emulsifier and do not bring about any particular additional advantages.

Lower concentrations of the polyisocyanate compound and active-hydrogen-containing compound in the inert liquid tend to give a smaller particle size. The concentration preferred from the standpoint of productivity may range from 20 to 70 parts by weight.

It is to be noted that, throughout the specification, the term "polyurethane" which can be produced in accordance with the present invention embraces thermoplastic polyurethanes, thermoplastic urethane prepolymers, and these polyurethanes and prepolymers in the form of poly(urethane-urea).

Examples of polyisocyanate compounds usable for the synthesis of the fine polyurethane particles or the fine polyurethane gel particles according to the present invention include those containing two isocyanate groups, such as tolylene diisocyanate, 4,4'-diphenylmethane diisocyanate, xylene diisocyanate, metaxylene diisocyanate, 1,6-hexamethylene diisocyanate, lysine diisocyanate, 4,4'-methylene-bis(cyclohexyl isocyanate), methylcyclohexane-2,4-(or -2,6-)-diisocyanate, 1,3-bis(isocyanatomethyl)cyclohexane, isophorone diisocyanate, trimethylhexamethylene diisocyanate, and dimeric acid diisocyanate.

Also usable in the present invention are those obtained by converting these compounds into their isocyanurate forms, biuret forms, adduct forms and polymeric forms and containing polyfunctional isocyanate groups, for example, 4,4', 4"-triphenylmethane triisocyanate, the cyclic trimer of 2,4-tolylene diisocyanate, the cyclic trimer of 2,6-tolylene diisocyanate, cyclic trimers of mixed 2,4- and 2,6-tolylene diisocyanates, the cyclic trimer of diphenylmethane-4,4'-diisocyanate, the reaction product of 3 moles of diphenylmethane-4,4'-diisocyanate and 1 mole of trimethylolpropane, the reaction product of 3 moles of 2,4-tolylene diisocyanate and 1 mole of trimethylolpropane, the reaction product of 3 moles of 2,6-tolylene diisocyanate and 1 mole of trimethylolpropane, 3 moles of 2,4-tolylene diisocyanate and 1 mole of trimethylolethane, the reaction product of 3 moles of 2,6-tolylene diisocyanate and 1 mole of trimethylolethane, and the reaction product of 3 moles of mixed 2,4- and 2,6-tolylene diisocyanates and 1 mole of trimethylolpropane; and those obtained by subjecting compounds, which contain one active hydrogen in a molecule, such as methanol, ethanol, phenol, cresol, ε-caprolactam, methyl ethyl ketoxime, acetoxime, N,N-dimethylhydroxyamine, diethyl malonate and acetylacetone and some of or all the isocyanate groups of these isocyanate compounds to an addition reaction.

Examples of active-hydrogen-containing compounds usable in the present invention include those reactive with isocyanate compounds, such as water, ethylene glycol, propylene glycol, 1,4-butanediol, 1,5-pentanediol, 1,6-hexanediol, octanediol, neopentyl glycol, glycerin, trimethylolpropane, hexanetriol, triethanolamine, pentaerythritol, ethylenediamine, propylamine, butylamine, 1,4-benzenethiol, sorbitol, polypropylene glycol, polyethylene glycol, polyethylene adipate, polybutylene adipate, polytetramethylene glycol, polyhexamethylene adipate, poly-ε-caprolactone, and polyhexamethylene carbonate. They can be used singly, in combination, or as copolymers.

The kinds and amounts of the isocyanate compound and active-hydrogen-containing compound used in the present invention and their ratio are determined depending on the application purpose of the resulting fine polyurethane particles or fine polyurethane gel particles. For thermoplastic powder coating compositions, for example, it is possible to produce fine polyurethane particles or fine polyurethane gel particles ranging from soft particles to hard particles (i.e., of melting temperatures ranging from a low melting temperature to a high melting temperature) by using polyether diols and/or polyester diols and bifunctional chain extenders as active-hydrogen-containing compounds and a bifunctional compound as an isocyanate compound in accordance with a conventional production process of polyurethane.

Further, particles of a prepolymer having an NCO/OH ratio not greater than 1.0 can be used as a thermosetting powder coating composition by blending a block isocyanate with the particles. This powder coating composition can be applied to an object by a known method such as fluidized bed coating, spray coating or dust coating. The coating composition can form a coating film having high elasticity and excellent durability such as heat resistance and abrasion resistance on metals such as vehicles, home electric appliances, houses, construction materials and civil engineering materials.

For the production of fine polyurethane gel particles, the kinds and amounts of the polyisocyanate compound and active-hydrogen-containing compound used in the present invention and their ratio are determined depending on the application purpose of the resulting fine polyurethane gel particles. Either one of the polyisocyanate compound and active-hydrogen-containing compound, however, must be in the form of a trifunctional or still higher functional compound. For example, if the polyisocyanate is bifunctional, the active-hydrogen-containing compound must be in the form of a trifunctional or higher functional compound. If the active-hydrogen-containing compound is bifunctional, on the contrary, the polyisocyanate must be in the form of a trifunctional or still higher functional compounds. Alternatively, both can have trifunctionality or higher functionality. Although the NCO/OH ratio is determined depending on the compounds employed and properties required for the resulting product, a preferred ratio may range from 0.5 to 1.2.

Incorporation of such fine polyurethane gel particles in a paint or coating composition is useful for forming, on the surface of the object, a coating film excellent in matting property, abrasion resistance, anti-scratching strength and elasticity. It can also bring about similar advantages when employed as a modifier for rubbers, elastomers or resins.

The inert liquid, which is used for the reaction of both the compounds and forms a continuous phase for the dispersion of the resulting fine polyurethane particles or fine polyurethane gel particles, is practically a non-solvent for these particles and contains no active hydrogen. Examples of the inert liquid include hydrocarbons such as pentane, hexane, heptane, octane, decane, petroleum ether, petroleum benzine, ligroin, petroleum spirit, cyclohexane, methylcyclohexane, toluene and xylene; and dimethylpolysiloxane. They can be used either singly or in combination. Among these inert liquids, those having a boiling point not higher than 150° C. are preferred from the standpoint of the productivity in the separation step for each inert liquid and the fine particles synthesized. The synthesis can be conducted at a low temperature provided that a known catalyst is employed. A synthesis temperatures of 40° C. or higher is, however, preferred from the standpoint of the efficiency in work.

Colloidal polyurea particles used as an emulsifier upon synthesis of the fine polyurethane particles or fine polyurethane gel particles are each composed of a solvated portion and a non-solvated portion and the non-solvated portion preferably has a particle size of from 0.01 µm to 1.0 µm. Such colloidal polyurea particles can be obtained, for example, by the reaction of a polyamine compound with an oil-modified polyol and a polyisocyanate (or with an NCO-terminated prepolymer composed of the oil-modified polyol and the polyisocyanate) in a non-aqueous medium.

As the reaction proceeds, insoluble urea domains are formed in the medium by hydrogen bonding of urea bonds and at the same time, the oil-modified polyol chains are solvated in the medium. This solvation prevents the growth of the colloidal polyurea particles which would otherwise be caused by coagulation or the like of the insoluble urea domains. Stable colloidal polyurea particles can therefore be obtained easily.

Furthermore, the oil-modified polyol employed has low crystallinity in the non-aqueous medium and even in the process of formation of a polymer as a result of a progress of the reaction, the polymer chains composed mainly of the oil-modified polyol can therefore still move around freely to some extent in the medium so that an insoluble crystalline portion and a soluble non-crystalline portion separate easily from each other, thereby forming a urea domain which has, as a core of the particle, the insoluble crystalline portion formed by the hydrogen bonding of urea bonds and the solvated polymer chains are regularly oriented outwardly around the urea domain. This action is fundamentally different from that of the surfactant employed in the conventionally known production method of colloidal particles by polymerization in the presence of micells.

The above production process of the colloidal polyurea particles will next be described more specifically. First, an oil-modified polyol and a polyisocyanate compound are reacted in a non-aqueous medium or in a solventless manner, whereby an NCO-containing prepolymer is synthesized.

The resulting prepolymer is then charged in a stirrer-equipped jacketed synthesis reactor and its concentration is adjusted to 5–70 wt.% by adding a non-aqueous solvent. Under stirring, the resulting solution is gradually added with a solution of a polyamine compound, the concentration of said solution having been adjusted beforehand to 2–20 wt.%, to conduct a polyurea-forming reaction, whereby colloidal polyurea particles are produced.

The addition of the polyamine can also be conducted by adding the prepolymer or its solution to the polyamine solution. Although no particular limitation is imposed on the temperature for the synthesis of the polymer, the preferred temperature ranges from 30° C. to 120° C.

Although no particular limitation is imposed on the concentration and temperature for the synthesis of the polymer, the type and stirring power of the agitator and the adding rates of the polyamine solution and the prepolymer or a solution thereof, it is preferred to control the reaction for the prevention of any rapid progress of the reaction because the polyamine compound and isocyanate groups of the prepolymer react quickly.

The oil-modified polyol usable for the production of the colloidal polyurea particles has bifunctionality or lower functionality and preferably has a molecular weight of 1,000±300 although not necessarily limited thereto. Exemplary oil-modified polyols include those allowed to contain about two or fewer hydroxyl groups by the alcoholysis of various oils with a lower alcohol or glycol, partial saponification of oils or the esterification of hydroxyl-containing fatty acids with a glycol; and the oil-modified polyols described in POLYURETHANES, CHEMISTRY AND TECHNOLOGY PART 1, Chemistry (pp 48–53) (written by J. H. SAUNDERS and K. C. FRISCH, published in 1962). Examples of the hydroxyl-containing fatty acids include ricinoleic acid, 12-hydroxystearic acid, castor oil fatty acids and hydrogenated castor oil fatty acids.

The oil-modified polyol and the polyisocyanate compound are reacted under the condition of 1<NCO/OH ≦2 to control the molecular weight of the resulting prepolymer chains to be solvated. Although no particular limitation is imposed on the molecular weight of the prepolymer so synthesized, the molecular weight may preferably ranges from about 500 to 15,000.

As the polyisocyanate compound usable in the present invention, any known polyisocyanate compounds can be used. Particularly preferred examples include aliphatic and alicyclic diisocyanate compounds such as hexamethylene diisocyanate, hydrogenated TDI, hydrogenated MDI and isophorone diisocyanate.

As a non-aqueous medium usable for the production of the colloidal polyurea particles, any non-aqueous medium can be employed insofar as it can dissolve the starting materials, that is, the oil-modified polyol, diisocyanate compound and polyamine compound and contains no active hydrogen therein. Particularly preferred examples include hydrocarbons such as hexane, heptane, octane, decane, cyclohexane, toluene and xylene. Incidentally, the term "dissolve" as used herein embraces both "dissolution at room temperature" and "dissolution at a higher temperature".

Illustrative of the polyamine compound usable for the production of the colloidal polyurea particles include ethylene diamine, diaminopropane, diaminobutane, hexamethylenediamine, trimethylhexamethylenediamine, N-aminoethylenepiperazine, bis-aminopropylpiperazine, polyoxypropylenediamine, 4,4-diaminodicyclohexylmethane, isophoronediamine, thiourea and methyliminobispropylamine. They can be used preferably either singly or in combination.

The kinds and amounts of the oil-modified polyol, diisocyanate compound, polyamine compound and the resulting prepolymer, which are usable in the present invention, and their ratio can be determined for the purpose of controlling the size and stability of the colloidal polyurea particles in the solvent employed. In other words, the colloidal polyurea particles according to the present invention are each formed of a urea domain, which is a crystalline portion not solvated in the solvent, and polymer chains which extend from the urea domain and are solvated in the solvent.

The properties of the colloidal polyurea particles are determined depending on the size of the urea domain of each colloidal polyurea particle and the size and form of the solvated polymer chains.

As has been described above, the colloidal polyurea particles formed individually of the urea domain and the solvated polymer chains take the form of a stable colloidal polyurea dispersion in a solvent. The urea domain of each colloidal polyurea particle in the dispersion ordinarily has a particle size of 0.01–1.0 μm. The solvated polymer chains each has a molecular weight of about 500–15,000. A weight ratio of the urea domain (urea bonds or polyamine compound) to the polymer chains preferably ranges from 0.5 to 30. When the ratio of the urea bonds is smaller than 0.5, non-solvated urea domains cannot be formed easily in the resulting colloidal polyurea particles, thereby facilitating dissolution of the colloidal polyurea particles in the non-aqueous medium. No good colloidal polyurea particles can be formed accordingly. If the ratio of the urea bonds is greater than 30, on the other hand, the non-solvated urea domains become greater, thereby lowering the stability of the resulting colloidal polyurea particles and making the colloidal polyurea particles more apt to coagulation.

The above-described colloidal polyurea dispersion seems to have a bluish opaque to yellowish opaque color owing to irregular reflection of light. The colloidal polyurea dispersion can be, after being dried and solidified, re-dispersed easily in a hydrocarbon solvent having relatively low solubility so that a colloidal polyurea dispersion having a desired concentration can be obtained. It is substantially soluble in a polar solvent such as dimethyl formamide, formamide, dimethyl sulfoxide, methyl ethyl ketone or butyl acetate. Addition and mixing of a solvent having low solubility such as that described above, in a proper amount to the solution of the cried and solidified colloidal polyurea causes precipitation and crystallization of urea bonds in the polymer, thereby forming non-solvated urea domains. A colloidal polyurea dispersion is hence provided.

The colloidal polyurea particles are heterogeneous particles which are each composed of a urea domain, that is, a non-solvated crystalline portion and solvated polymer chains, so that they have properties of both the non-solvated urea domains and the solvated polymer chains. As one example, when colloidal polyurea particles which had been synthesized by reacting an NCO-containing prepolymer and a polyamine compound at an NCO/NH$_2$ molar ratio of 1.0 were coated as a dispersion having a solid content of 10 wt.% on a glass plate to give a dry film thickness of 10 μm, followed by drying to form a film, the resulting dry film had excellent transparency, was free of adhesiveness and surprisingly, had a melting point even as high as at least 200° C.

Figure 1:
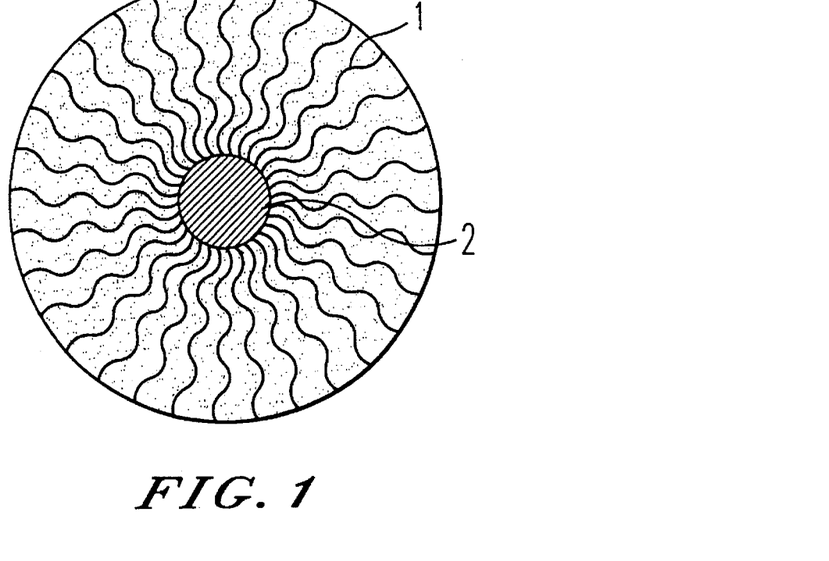
FIG. 1 illustrates an imaginary cross-sectional view of a colloidal polyurea particle according to the present invention.

In a solvent, the colloidal polyurea particles useful in the present invention are presumed to take such a form as shown in FIG. 1. It is possible to control the particle size of the colloidal polyurea particles by controlling the whole size of each particle containing the solvated polymer portion and the urea domain and also the size of each of the solvated polymer portion and the urea domain. Incidentally, the particle size referred to above with respect to the dispersion of the colloidal polyurea particles indicates that of the urea domain portion.

To produce a stably-controlled dispersion of colloidal polyurea particles, it is desired to have a distinct phase separation, as is shown in FIG. 1, between the solvated polymer portion and the urea domain portion. To achieve this, it is necessary to form each particle without allowing the polymer chains and the crystalline urea domain to exist as a mixture and for this purpose, the synthesis conditions permitting easy separation between them are required.

The lower the concentrations of both the solutions of the NCO-containing prepolymer and the polyamine compound and the lower the adding rate of one of the solutions to the other solution, the better the results. It is sufficient to stir them in a propeller mixer. Where the raw material solutions have high concentrations and/or the adding rate is high, on the other hand, it is desired to conduct the synthesis while mixing them under high shear force in a homogenizer or the like. The reaction temperature is determined depending on the kind of the solvent employed and the solubility of urea domains in the solvent. The preferred temperature is 30°–120° C. at which the synthesis can easily be controlled, although not necessarily limited thereto. Urea domains can be formed in the course of the synthesis or alternatively, in course of cooling of particles synthesized at a high temperature.

Factors important with respect to the colloidal polyurea particles are the kind and concentration of their surface groups as well as their dispersibility in the inert liquid and their particle size after dispersion. When the colloidal polyurea particles serve as an emulsifier, they act as a w/o- to o/o-type emulsifier. They can exhibit their action on the basis of correlation between the degree in hydrophilicity or hydrophobicity of the isocyanate compound and the active-hydrogen-containing compound and the inert liquid. As a result of an investigation conducted with these conditions in mind, it has been found that the particle size of the fine polyurethane particles or fine polyurethane gel particles can be controlled by adjusting the amount of the colloidal polyurea particles relative to the amounts of the polyisocyanate compound and active-hydrogen-containing compound. The greater the amount of the colloidal polyurea particles in the above range, the smaller the particle size of the resulting fine polyurethane particles or fine polyurethane gel particles, and the smaller the amount, the greater the particle size.

The fine polyurethane particles or fine polyurethane gel particles of this invention can obtained by, under normal pressure or reduced pressure, separating the inert liquid from the dispersion of the fine polyurethane particles or fine polyurethane gel particles which had been produced from the above-described raw materials. Apparatus known for this purpose, such as spray drier, filter-equipped vacuum drier, stirrer-equipped vacuum drier and tray-type drier, are all usable. The preferred drying temperature may range from 40° C. to 80° C. under reduced pressure although it is affected by the vapor pressure of the inert liquid, the softening point and particle size of the fine polyurethane particles or fine polyurethane gel particles.

The fine polyurethane particles or fine polyurethane gel particles produced as described above are in the form of true spherical particles having a particle size of from 0.5 μm to 100 μm, preferably 1–20 μm. Where the composition of polyurethane is the same, the particle size is affected by the manner of emulsification (e.g., propeller-type stirrer, anchor-type stirrer, homogenizer, spiral agitator or the like) in the synthesis reactor and the intensity of the stirring force. In particular, the particle size is governed by the concentrations of the polyisocyanate compound and active-hydrogen-containing compound in the inert liquid and also by the kind and amount of the colloidal polyurea particles added. The mechanical stirring and shear force for emulsification of the polyisocyanate compound and active-hydrogen-containing compound are determined at the initial stage of the emulsification. The stronger the mechanical stirring and shear force, the smaller the particle size. Subsequent stirring and shear force do not give any significant influence. It is however to be noted that unduly strong stirring and shear force are not preferred as they tend to promote coagulation of dispersed particles.

In the present invention, it is also possible to incorporate in at least a portion of at least one of the raw materials various additives, for example, colorants such as dyes and pigments, plasticizers, stabilizers, antioxidants, ultraviolet absorbers, anti-static agents, abrasive materials and extender pigments upon production of the fine polyurethane particles or fine polyurethane gel particles, followed by synthesis of polyurethane, whereby fine polyurethane particles or fine polyurethane gel particles suited for various applications can be obtained.

Figure 2:
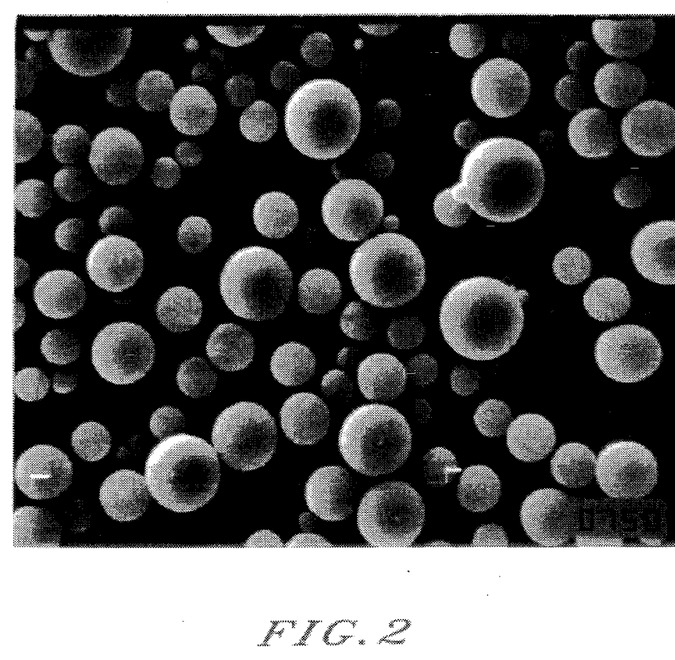
FIG. 2 illustrates one example of the state of fine polyurethane particle or fine polyurethane gel particle according to the present invention.
Figure 3:
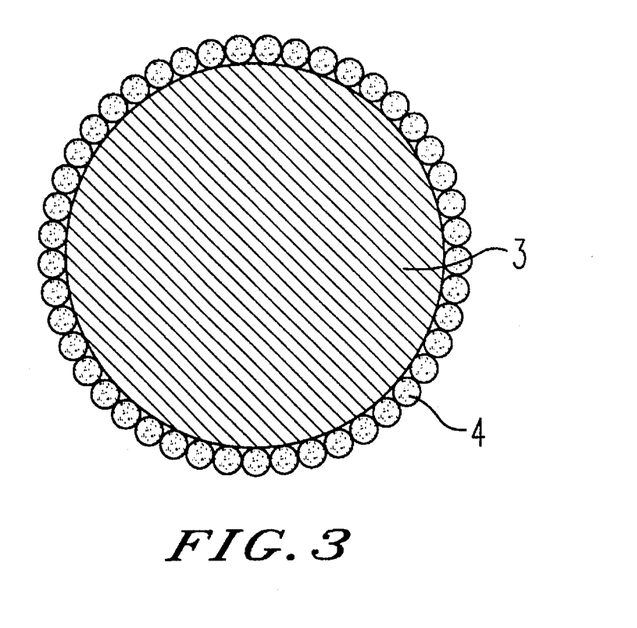
FIG. 3 is an imaginary cross-sectional view of a fine polyurethane particle or fine polyurethane gel particle according to the present invention.

As is illustrated in the electron micrograph (magnification: ×750) in FIG. 2, these fine particles are substantially true spherical. As is also shown in the imaginary sketch in FIG. 3, colloidal polyurea particles are adhered to or otherwise cover the surface of each of the fine polyurethane particles or fine polyurethane gel particles and they have excellent unadherence and heat resistance so that fine particles having extremely high flowability can be obtained by simply separating the fine particles from the dispersion medium. Unlike the conventional technology, the present invention does not require any cumbersome and costly grinding step or classification procedure upon forming the resulting polyurethane into fine particles.

The present invention will hereinafter be described by Examples and Comparative Examples. It is to be noted that these examples are merely illustrative and are not intended to limit the present invention thereto. Incidentally, all designations of "part" or "parts" and "%" in the examples indicate part or parts by weight and wt.% unless otherwise specifically indicated.

(Production of colloidal polyurea particles)

EXAMPLE 1

In a synthesis reactor equipped with a stirrer, 100 parts of a bifunctional oil-modified polyol having a hydroxyl number of 119.5 and 100 parts of n-octane were charged to dissolve the former in the latter. While the polyol solution was controlled at 50° C. under stirring, 47.3 parts of isophorone diisocyanate were added to the solution gradually over one hour to give an NCO/OH ratio of 2. The reaction was continued for three hours under the above conditions, followed by further reaction at 80° C. for 3 hours, whereby the synthesis was completed. The concentration of the reaction mixture so obtained was adjusted to 50% with n-octane so that a prepolymer solution (PP-1) having 2.9% of NCO groups was obtained. The prepolymer so obtained had a molecular weight of 1,383.

In a synthesis reactor equipped with a stirrer, 40 parts of the PP-1 so obtained and 60 parts of n-octane were charged to dissolve the former in the latter. While the resulting solution was controlled at 70° C. under stirring, 23.4 parts of a 10% solution of isophoronediamine in n-octane, which solution had been prepared in advance, were added gradually to the former solution over 5 hours, leading to the completion of the reaction. As a result, a 18.1% dispersion (C-1) of colloidal polyurea particles was obtained. The colloidal polymer particles had a polyamine (urea bond portion)/prepolymer chains percentage of 11.7%. The dispersion so obtained was stable and had a bluish opaque color.

EXAMPLE 2

In a synthesis reactor equipped with a stirrer, 100 parts of a bifunctional oil-modified polyol having a hydroxyl number of 119.5 and 100 parts of n-octane were charged to dissolve the former in the latter. While the resulting solution was controlled at 50° C. under stirring, 26.6 parts of isophorone diisocyanate were gradually added thereto over one hour to give an NCO/OH ratio of 1.1. The reaction was continued for three hours under the above conditions, followed by further reaction for 4 hours at 80° C., whereby the synthesis was completed. The concentration of the reaction mixture was then adjusted to 50% with n-octane, whereby a prepolymer solution (PP-2) containing 1.64% of NCO groups was obtained. The prepolymer so obtained had a molecular weight of 2,543.

In a synthesis reactor equipped with a stirrer, 20 parts of the resulting PP-2 and 80 parts of n-octane were charged to dissolve the former in the latter. While the resulting solution was controlled at 70° C. under stirring, 17.0 parts of a 1% solution of isophoronediamine in n-octane, which solution had been prepared in advance, were gradually added to the former solution over 8 hours, whereby the reaction was completed. As a result, an 8.7% dispersion (C-2) of colloidal polyurea particles having a polyamine/prepolymer chains percentage of 1.7% was obtained. The dispersion so obtained was stable and had a bluish opaque color.

EXAMPLE 3

In a synthesis reactor equipped with a stirrer, 100 parts of a monofunctional oil-modified polyol having a hydroxyl number of 157.8 were charged. While the polyol was controlled at 60° C. under stirring, 49.0 parts of tolylene diisocyanate were gradually added thereto over one hour to give an NCO/OH ratio of 2.0. Under the above conditions, the reaction was conducted for 5 hours, leading to the completion of the synthesis. The concentration of the reaction mixture was then adjusted to 60% with n-heptane so that a prepolymer solution (PP-3) containing 4.71% of NCO groups was obtained. The prepolymer so obtained had a molecular weight of 528.

In a synthesis reactor equipped with a stirrer, 100 parts of the resulting PP-3 were charged. While they were controlled at 50° C. under stirring, 88.5 parts of a 10% solution of trimethylhexamethylenediamine in n-heptane were gradually added thereto over 5 hours, leading to the completion of the reaction. As a result, a 36.5% dispersion (C-3) of colloidal polyurea particles having a polyamine/prepolymer chains percentage of 14.75% was obtained. The resulting dispersion was stable and had a yellowish opaque color.

EXAMPLE 4

In a synthesis reactor equipped with a stirrer, 100 parts of a bifunctional oil-modified polyol having a hydroxyl number of 165.5 and 100 parts of n-decane were charged to dissolve the former in the latter. While the resulting solution was controlled at 50° C. under stirring, 49.6 parts of hexamethylene diisocyanate were gradually added thereto over one hour to give an NCO/OH ratio of 2.0. Under the above conditions, the reaction was continued for 3 hours, followed by a further 3-hour reaction at 80° C., whereby the synthesis was completed. The concentration of the reaction mixture was then adjusted to 50% with n-decane so that a prepolymer solution (PP-4) containing 4.05% of NCO groups was obtained. The resulting prepolymer had a molecular weight of 1,012.

In a synthesis reactor equipped with a stirrer, 40 parts of the resulting PP-4 and 60 parts of n-decane were charged to dissolve the former in the latter. While the resulting solution was controlled at 70° C. under stirring, 49.8 parts of a 5% solution of hexamethylenediamine in n-decane, which solution had been prepared in advance, were gradually added thereto over 8 hours to complete the reaction. As a result, a 15% dispersion (C-4) of colloidal polyurea particles having a polyamine/prepolymer chains percentage of 12.45% was obtained. The resulting dispersion was stable and had a transparent, bluish opaque color.

(Production of fine polyurethane particles)

EXAMPLE 5

In a 2-1 stainless steel vessel, 44 parts of the colloidal polyurea (C-1) obtained in Example 1 and 356 parts of n-octane were charged and mixed. The resulting mixture was maintained at 40° C. To the resulting mixture, a uniform mixture of 228 parts of polybutylene adipate having an average molecular weight of 1,020, 30.4 parts of 1,4-butanediol and 141.7 parts of MDI, which had been prepared in advance by heating and mixing them at 40° C., was gradually added, followed by emulsification for 30 minutes in a homogenizer. The emulsion so obtained contained the dispersoid as fine particles having an average particle size of 5 μm and remained stable without settling of the fine particles.

The resulting emulsion was then charged in a synthesis reactor equipped with an anchor agitator, and was heated to 80° C. while being agitated at 400 rpm. The reaction was completed in 3 hours, whereby a polyurethane dispersion was obtained. The dispersion so obtained was then transferred to a vacuum drier and the inert liquid was separated from the dispersion under a reduced pressure of 50 mmHg or lower, whereby fine polyurethane particles (A) were obtained. The fine polyurethane particles so obtained were in the form of white, true spherical particles having an average particle size of 5 μm.

EXAMPLE 6

In a 2-l stainless steel vessel, 184 parts of the colloidal polyurea (C-2) obtained in Example 2 and 216 parts of n-octane were charged and mixed. The resulting mixture was then maintained at 40° C. To the resulting mixture, a uniform mixture of 228 parts of polybutylene adipate having an average molecular weight of 1,020, 30.4 parts of 1,4-butanediol and 141.7 parts of MDI, which had been prepared in advance by heating and mixing them at 40° C., was gradually added, followed by emulsification in a homogenizer for 30 minutes. The emulsion so obtained contained the dispersoid as fine particles having an average particle size of 16 μm and remained unstable without settling of the fine particles.

The resulting emulsion was then charged in a synthesis reactor equipped with an anchor agitator, and was heated to 80° C. while being agitated at 400 rpm. The reaction was completed in 3 hours, whereby a polyurethane dispersion was obtained. The dispersion so obtained was transferred to a vacuum drier and the inert liquid was separated from the dispersion under a reduced pressure of 50 mmHg or lower, whereby fine polyurethane particles (B) were obtained. The fine polyurethane particles so obtained were in the form of white, true spherical particles having an average particle size of 16 μm.

EXAMPLE 7

In a 2-l stainless steel vessel, 109 parts of the colloidal polyurea (C-3) obtained in Example 3 and 491 parts of heptane were charged and mixed. The resulting mixture was maintained at 40° C. To the resulting mixture, a uniform mixture of 228 parts of polybutylene adipate having an average molecular weight of 1,020, 30.4 parts of 1,4-butanediol and 141.7 parts of MDI, which had been prepared in advance by heating and mixing them at 40° C., was gradually added, followed by emulsification in a homogenizer for 30 minutes. The emulsion so obtained contained a dispersoid as fine particles having an average particle size of 3 μm and remained stable without settling of the fine particles.

The resulting emulsion was then charged in a synthesis reactor equipped with an anchor agitator, and was heated to 80° C. while being agitated at 400 rpm. The reaction was completed in 3 hours, whereby a polyurethane dispersion was obtained. The dispersion so obtained was then transferred to a vacuum drier and the inert liquid was separated from the dispersion under a reduced pressure of 50 mmHg or lower, whereby fine polyurethane particles (C) were obtained. The fine polyurethane particles so obtained were in the form of white, true spherical particles having an average particle size of 3 μm.

EXAMPLE 8

In a 2-l stainless steel vessel, 5.5 parts of the colloidal polyurea (C-3) obtained in Example 3 and 597.5 parts of heptane were charged and mixed. The resulting mixture was maintained at 40° C. To the resulting mixture, a uniform mixture of 228 parts of polybutylene adipate having an average molecular weight of 1,020, 30.4 parts of 1,4-butanediol and 141.7 parts of MDI, which had been prepared in advance by heating and mixing them at 40° C., was gradually added, followed by emulsification in a homogenizer for 30 minutes. The emulsion so obtained contained a dispersoid as fine particles having an average particle size of 20 μm and remained stable without settling of the fine particles.

The resulting emulsion was then charged in a synthesis reactor equipped with an anchor agitator, and was heated to 80° C. while being agitated at 400 rpm. The reaction was completed in 3 hours, whereby a polyurethane dispersion was obtained. The dispersion so obtained was then transferred to a vacuum drier and the inert liquid was separated from the dispersion under a reduced pressure of 50 mmHg or lower, whereby fine polyurethane particles (D) were obtained. The fine polyurethane particles so obtained were in the form of white, true spherical particles having an average particle size of 20 μm.

EXAMPLE 9

In a 2-l stainless steel vessel, 80 parts of the colloidal polyurea (C-4) obtained in Example 4 and 320 parts of petroleum spirit were charged and mixed into a uniform mixture. The mixture was maintained at 40° C. To the mixture, a uniform mixture of 228 parts of polybutylene adipate having an average molecular weight of 1,020, 30.4 parts of 1,4-butanediol and 141.7 parts of MDI, which had been prepared in advance by heating and mixing them at 40° C., was gradually added, followed by emulsification in a homogenizer for 30 minutes. The emulsion so obtained contained a dispersoid as fine particles having an average particle size of 12 μm and remained stable without settling of the fine particles.

The resulting emulsion was then charged in a synthesis reactor equipped with an anchor agitator, and was heated to 80° C. while being agitated at 400 rpm. The reaction was completed in 3 hours, whereby a polyurethane dispersion was obtained. The dispersion so obtained was then transferred to a vacuum drier and the inert liquid was separated from the dispersion under a reduced pressure of 50 mmHg or lower, whereby fine polyurethane particles (E) were obtained. The fine polyurethane particles so obtained were in the form of white, true spherical particles having an average particle size of 12 μm.

EXAMPLE 10

In a 2-l stainless steel vessel, 22 parts of the colloidal polyurea (C-1) obtained in Example 1 and 400 parts of isooctane were charged and mixed. The resulting mixture was maintained at 40° C. To the resulting mixture, a uniform mixture of 219.7 parts of polycaprolactonediol having an average molecular weight of 2,000, 32.9 parts of 1,4-butanediol, 153.1 parts of 4,4'-methylenebis(cyclohexyl isocyanate) and 0.02 part of stannous octoate, which had been prepared in advance by heating and mixing them at 60° C., was gradually added, followed by emulsification in a homogenizer for 10 minutes. The emulsion so obtained contained a dispersoid as fine particles having an average particle size of 12 μm and remained stable without settling of the fine particles.

The resulting emulsion was then charged in a synthesis reactor equipped with an anchor agitator, and was heated to 80° C. while being agitated at 400 rpm. The reaction was completed in 3 hours, whereby a polyurethane dispersion was obtained. The dispersion so obtained was transferred to a vacuum drier and the inert liquid was separated from the dispersion under a reduced pressure of 50 mmHg or lower, whereby fine polyurethane particles (F) were obtained. The fine polyurethane particles so obtained were in the form of white, true spherical particles having an average particle size of 13 μm.

Physical properties of a film made from each of the fine polyurethane particles (A)–(F) are shown in Table 1.

TABLE 1

| | 100% Modulus | Tensile strength MPa | Elongation % | Film formation | Measuring method of physical properties |
|---|---|---|---|---|---|
| Fine polyurethane particles (A) | 9.3 | 42.0 | 500 | *3 | *5 |
| Fine polyurethane particles (B) | 8.4 | 38.0 | 440 | *3 | *5 |
| Fine polyurethane particles (C) | 8.5 | 40.0 | 480 | *3 | *5 |
| Fine polyurethane particles (D) | 7.9 | 35.0 | 450 | *3 | *5 |
| Fine polyurethane particles (E) | 7.9 | 45.0 | 500 | *3 | *5 |
| Fine polyurethane particles (F) | 6.5 | 29.0 | 430 | *4 | *6 |
| Comparative Example 1 *1 | 7.4 | 44.0 | 450 | *3 | *5 |
| Comparative Example 2 *2 | 6.5 | 43.0 | 450 | *3 | *5 |

*1: Polyurethane obtained by melt polymerizing through an extruder the same materials in the same amounts as for the fine polyurethane particles (A) except for the omission of the colloidal polyurea particles.
*2: Polyurethane obtained by melt polymerizing through an extruder the same materials in the same amounts as for the fine polyurethane particles (E) except for the omission of the colloidal polyurea particles.
*3: The film was prepared by placing polyurethane on a metal plate, setting a guide plate to give a film thickness of about 1 mm and then press-molding it at 200° C. and undre 100 kg/cm² for 30 minutes.
*4: A polyurethane solution was prepared by charging 30 parts of polyurethane and 70 parts of dimethyl formamide in a container and then stirring them at 80° C. for 60 minutes in a test mixer. Then, the resultant solution was coated on a releas pater to give a film thickness of 30–50 μm, dried at 70–100° C. for 10 minutes and then left over at 70° C. for 10 minutes and then left over at 70° C. for 2 days, whereby the film was produced.
*5: Conducted in accordance with JIS K7311.
*6: The film formed in *4 was allowed to cool down to room temperature and was cut into a 6 cm long and 1.5 cm wide rectangle. The film was peeled off from the release paper and its physical properties were measured from a tensile strength v. elongation curve obtained by a "Shimadzu Autograph AG-500A" (trade name, manufactured by Shimadzu Corporation) under the following conditions:
Crosshead speed: 200 mm/min
Chart speed: 100 mm/min.
Measurement temperature: 25° C.

(Production of fine polyurethane gel particles)

EXAMPLE 11

At 60° C., 20 parts of polybutylene adipate having an average molecular weight of 1,000 were dissolved. To the resulting solution, 8.12 parts of an isocyanurate polyisocyanate of hexamethylene diisocyanate were added and then, they were mixed uniformly. The resulting uniform mixture was gradually added to a mixed solution of 3.0 parts of the colloidal polyurea (C-1) obtained in Example 1 in 25 parts of n-octane, which solution had been prepared in advance in a 1-l stainless steel vessel, followed by emulsification in a homogenizer for 15 minutes. The emulsion so obtained contained the dispersoid as particles having an average particle size of 5 μm and remained stable without separation.

The emulsion so obtained was charged in a synthesis reactor equipped with an anchor agitator, and was heated to 80° C. while being agitated at 400 rpm. The reaction was completed in 6 hours, whereby a dispersion of fine polyurethane gel particles was obtained. The resulting dispersion was vacuum-dried at 100 torr to separate the n-octane, whereby fine polyurethane gel particles (1) were obtained. The fine polyurethane gel particles so obtained were in the form of white, true spherical particles having an average particle size of 5 μm.

EXAMPLE 12

In a synthesis reactor equipped with an anchor agitator, 100 parts of polytetramethylene adipate having an average molecular weight of 2,000 were charged and were dissolved by heating it to 70° C. While stirring, 25 parts of diphenylmethane diisocyanate (MDI) were gradually added to the resultant solution. The reaction was conducted for 5 hours, whereby a prepolymer having an NCO/OH ratio of 2 was obtained. To the prepolymer so obtained, 4.5 parts of trimethylol propane were added and then mixed.

The resulting mixture (25 parts) was gradually added to a mixed solution of 12 parts of the colloidal polyurea (C-2) obtained in Example 2 in 50 parts of n-heptane, which solution had been prepared beforehand in a 1-l stainless steel vessel, followed by emulsification for 25 minutes in a homogenizer. The emulsion so obtained contained a dispersoid as particles having an average particle size of 8 μm and remained stable without settling of the fine particles.

The emulsion was then charged in a synthesis reactor equipped with an anchor agitator, and was heated to 100° C. while being agitated at 500 rpm. The reaction was completed in 5 hours, whereby a dispersion of fine polyurethane gel particles was obtained in the form of dispersion. Fine polyurethane gel particles (2) were obtained from the dispersion as in Example 5. The gel particles so obtained had an average particle size of 8 μm and were in the form of white, true spherical powder.

EXAMPLE 13

In a 500-ml separable flask, 12 parts of the colloidal polyurea (C-3) obtained in Example 3 and 150 parts of isooctane were charged and mixed. While they were mixed further in a homomixer, 100 parts of trifunctional polylactone polyol which had an average molecular weight of 1,250 and had been heated to 50° C. in advance were gradually added to the mixture to emulsify the same. Furthermore, 44.2 parts of a hexamethylene diisocyanate adduct of polyisocyanate were gradually added to the resulting emulsion.

While being agitated in a homomixer, the emulsion mixture so obtained was heated to 80° C., followed by the reaction for 3 hours. Then, 0.005 part of dibutyltin dilaurate was added, as a reaction catalyst, to the reaction mixture and they were reacted for further 4 hours, whereby a dispersion of fine polyurethane gel particles was obtained. Fine polyurethane gel particles (3) were obtained from the dispersion as in Example 5. The particles so obtained had an average particle size of 3 μm and were in the form of white, true spherical powder.

EXAMPLE 14

In a 500-ml separable flask, 10 parts of the colloidal polyurea (C-4) obtained in Example 4, 130 parts of isooctane and 20 parts of toluene were charged and mixed. While the resulting solution was mixed further in a homomixer, a mixture of 15 parts of a trifunctional polylactone polyol having an average molecular weight of 1,250, 85 parts of a bifunctional polylactone diol having an average molecular weight of 1,000 and 18 parts of tolylene diisocyanate, which mixture had been heated to 50° C. in advance, were gradually added to the former mixture to emulsify the same.

While being agitated in the homomixer, the emulsion so obtained was heated to 80° C., followed by the reaction for 3 hours. Then, 0.005 part of dibutyltin dilaurate was added, as a reaction catalyst, to the reaction mixture and the reaction was conducted for further 6 hours, whereby a dispersion of fine polyurethane gel particles was obtained. From the dispersion, fine polyurethane gel particles (4) were obtained as in Example 5. The particles so obtained had an average particle size of 12 μm and were in the form of white, true spherical powder.

The oil absorption, dispersibility and heat resistance of each of the fine polyurethane gel particles so obtained are shown in Table 2.

TABLE 2

| | Oil-absorption (g/g)*1 | | | Dispersibility*2 | | | Heat resistance °C.*3 |
|---|---|---|---|---|---|---|---|
| | MEK | Toluene | DOP | Solvent 1 | Solvent 2 | Solvent 3 | |
| Fine polyurethane gel particles (1) | 15 | 4 | 8 | A | A | A | >250 |
| Fine polyurethane gel particles (2) | 12 | 5 | 11 | A | A | A | >250 |
| Fine polyurethane gel particles (3) | 0.7 | 0.5 | 0 | A | A | A | >250 |
| Fine polyurethane gel particles (4) | 0.9 | 0.7 | 0 | A | A | A | >200 |

*1: Changes in the sizes (diameters) of the fine particles before and after oil absorption at 25° C. were observed under a microscope (the size before absorption was designated as "1").
*2: The state of the dispersion at the time when parts of the fine particles were added to 80 parts of a solvent and then hand-stirred gently was macroscopically observed.
A: Dispersion  B: Paste  C: Gel
Solvent 1: Ethyl acetate
Solvent 2: Dimethyl formamide
Solvent 3: Mineral spirit
*3: Heat resistance was measured on a Koffler hotbench.

What is claimed is:

1. Fine polyurethane particles having surfaces covered with colloidal polyurea particles, which are free flowing and exhibit good oil absorbance, heat resistance and abrasion resistance, prepared by polymerizing the components which form the polyurethane particles in a medium containing colloidal polyurea particles, each of the polyurea particles comprising a solvated portion and a non-solvated portion, said non-solvated portion having a particle size ranging from 0.01 μm to 1.0 μm, and said colloidal polyurea particles prepared by reacting an oil-modified polyol having 2 or less functional groups and a diisocyanate at a functional group ratio which satisfies the relationship:

1<NCO/OH≦2 thereby synthesizing an isocyanate-containing prepolymer, and then reacting at least a portion of the isocyanate groups of the polymer with a polyamine compound, said polyurea particles individually having a non-solvated, urea entity containing portion which forms hydrogen bonds with other urea groups.

2. Fine polyurethane particles according to claim 1, which are three-dimensionally cross-linked fine polyurethane gel particles.

3. Fine polyurethane particles according to claim 1, which have an average particle size ranging from 0.5 μm to 100 μm.

4. Fine polyurethane particles according to claim 1, which have an average particle size ranging from 1 μm to 20 μm.

5. A process for the production of fine polyurethane particles having surfaces covered with colloidal polyurea particles, which comprises:

emulsion polymerizing a polyisocyanate compound and an active-hydrogen-containing compound in an inert liquid containing colloidal polyurea particles as an emulsifier wherein the colloidal polyurea particles are present in amount of 1.0 to 20 parts by weight per 100 parts by weight of each of the polyisocyanate compound and the active-hydrogen-containing compound.

6. A process according to claim 1, wherein at least one of the polyisocyanate compound and the active-hydrogen-containing compound is trifunctional or has higher functionality.

7. A process according to claim 1, wherein an emulsion polymerization product is separated from the inert liquid in the form of a powder.

8. Colloidal polyurea particles, each of which comprises a solvated portion and a non-solvated portion, prepared by reacting an oil-modified polyol and a polyisocyanate, and then reacting the reaction product with a polyamine compound, said polyurea particles individually having a non-solvated, urea entity containing portion which forms hydrogen bonds with other urea groups, said non-solvated portion having a particle size of from 0.01 μm to 1.0 μm, and the weight ratio of said urea domain to the solvated polymer chain in each polyurea particle ranging from 0.5 to 30.

9. Colloidal polyurea particles, each of which comprises a solvated portion and a non-solvated portion, prepared by reacting an oil-modified polyol having two or less functional groups and a diisocyanate compound at a functional group ratio satisfying the relationship: 1<NCO/OH≦2 thereby synthesizing an isocyanato-containing prepolymer and then reacting at least a portion of the isocyanate groups of the prepolymer with a bifunctional amine compound, said non-solvated portion having a particle size of from 0.01 μm to 1.0 μm, and the weight ratio of said urea domain to the solvated polymer chain in each polyurea particle ranging from 0.5 to 30.

* * * * *